United States Patent
Aiouaz et al.

(10) Patent No.: US 8,120,494 B1
(45) Date of Patent: Feb. 21, 2012

(54) RFID READERS AND SYSTEMS WITH ANTENNA SWITCHING UPON DETECTING TOO FEW TAGS AND METHODS

(75) Inventors: Ali Aiouaz, Mission Viejo, CA (US); Paul Dietrich, Seattle, WA (US); David Ord, Aliso Viejo, CA (US); Omar Khwaja, Irvine, CA (US)

(73) Assignee: Impinj, Inc., Seattle, WA (US)

( * ) Notice: Subject to any disclaimer, the term of this patent is extended or adjusted under 35 U.S.C. 154(b) by 1315 days.

(21) Appl. No.: 11/749,281

(22) Filed: May 16, 2007

Related U.S. Application Data

(60) Provisional application No. 60/832,667, filed on Jul. 21, 2006, provisional application No. 60/839,746, filed on Aug. 24, 2006.

(51) Int. Cl.
*G08B 13/14* (2006.01)

(52) U.S. Cl. ............... 340/572.7; 340/572.1; 340/572.4; 340/10.1; 340/3.63; 340/7.25

(58) Field of Classification Search .... 340/572.1–572.8, 340/10.1, 10.2, 3.61–3.63, 7.25, 7.27, 571, 340/505; 705/1, 28, 29; 235/375, 385; 343/853, 343/876
See application file for complete search history.

(56) References Cited

U.S. PATENT DOCUMENTS

| | | | |
|---|---|---|---|
| 5,519,381 A | 5/1996 | Marsh et al. | |
| 5,686,902 A | 11/1997 | Reis et al. | |
| 6,040,773 A | 3/2000 | Vega et al. | |
| 6,330,971 B1 | 12/2001 | Mabry et al. | |
| 6,483,427 B1 | 11/2002 | Werb | |
| 6,641,036 B1 | 11/2003 | Kalinowski | |
| 6,661,335 B1 | 12/2003 | Seal | |
| 6,903,656 B1 | 6/2005 | Lee | |
| 6,963,270 B1 | 11/2005 | Gallagher et al. | |
| 7,098,770 B2 | 8/2006 | Charrat et al. | |
| 7,103,087 B2 | 9/2006 | Eastburn | |
| 7,319,398 B2 * | 1/2008 | Marino | 340/572.7 |
| 7,511,620 B2 * | 3/2009 | Malik | 340/572.7 |
| 7,724,141 B2 * | 5/2010 | Reynolds | 340/572.7 |
| 2004/0046642 A1 | 3/2004 | Becker et al. | |
| 2005/0280505 A1 | 12/2005 | Humes et al. | |
| 2005/0280506 A1 | 12/2005 | Lobanov et al. | |
| 2005/0280507 A1 | 12/2005 | Diorio et al. | |
| 2006/0071758 A1 | 4/2006 | Cooper et al. | |
| 2006/0077039 A1 | 4/2006 | Ibi et al. | |
| 2006/0261953 A1 | 11/2006 | Diorio et al. | |
| 2007/0035383 A1 | 2/2007 | Roemerman et al. | |
| 2007/0046432 A1 | 3/2007 | Aiouaz et al. | |
| 2007/0241906 A1 | 10/2007 | Malik | |
| 2009/0085748 A1 | 4/2009 | Barnes et al. | |

OTHER PUBLICATIONS

Diorio, et al., "Final Office Action", U.S. Appl. No. 11/210,573 mailed Sep. 9, 2009.
Diorio, et al., "Final Office Action", U.S. Appl. No. 11/210,575 mailed Sep. 9, 2009.

(Continued)

*Primary Examiner* — Anh V La
(74) *Attorney, Agent, or Firm* — Turk IP Law, LLC

(57) ABSTRACT

RFID readers, reader systems, and methods are provided that utilize smart antenna switching. A first signal is transmitted from a first antenna estimating presence of tags within the antennas field of view. If fewer than a predefined number of tags are estimated, the system switches to a second antenna. Otherwise, the tags found in the field of view of the first antenna are inventoried before switching to the second antenna.

67 Claims, 12 Drawing Sheets

OTHER PUBLICATIONS

Humes, et al., "Office Action", U.S. Appl. No. 11/210,348 mailed Apr. 8, 2008.
Final Office Action U.S. Appl. No. 11/749,235 mailed Jun. 8, 2011.
EPCglobal, Inc "Specification of RFID Air Interface-EPC Radio-Frequency Identity Protocols Class-1 Generation-2 UHF RFID Protocol for Communications at 860 MHz-960 MHz, Version 1.0.8." (a.k.a. "The Gen 2 Spec") EPCglobal Inc. Dec. 14, 2004, http://www.
EPCglobal, Inc "Specification of RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec") EPCglobal Inc. Dec. 17, 2005, http://www.
"Declaration of Stacy L. Jones authenticating attached website materials", www.autoid.org/SC31/sc_31_wg4_sg3.htm, Sep. 1, 2006.
Final Office Action U.S. Appl. No. 11/210,573 mailed Sep. 9, 2009.
Final Office Action U.S. Appl. No. 11/210,575 mailed Sep. 9, 2009.
Non-Final Office Action U.S. Appl. No. 11/210,384 mailed Apr. 8, 2008.

* cited by examiner

RFID READER SYSTEM DETAIL

*RFID READER SYSTEM CONFIGURATION WITH OPTIONAL LOCAL AND REMOTE COMPONENTS*

RFID READERS AND SYSTEMS WITH ANTENNA SWITCHING UPON DETECTING TOO FEW TAGS AND METHODS

RELATED APPLICATIONS

This utility patent application claims the benefit of U.S. Provisional Application Ser. No. 60/832,667 filed on Jul. 21, 2006, which is hereby claimed under 35 U.S.C. §119(e). The provisional application is incorporated herein by reference.

This utility patent application claims the benefit of U.S. Provisional Application Ser. No. 60/839,746 filed on Aug. 24, 2006, which is hereby claimed under 35 U.S.C. §119(e). The provisional application is incorporated herein by reference.

This application may be found to be related to the following applications, all of which are incorporated herein by reference:

Application titled "RFID READERS AND SYSTEMS WITH ANTENNA SWITCHING UPON TAG SENSING, AND METHODS", by the same inventors, filed with the USPTO on the same day as the present application, and due to be assigned to the same assignee Ser. No. 11/749,235; and Application titled "CHANGING MANNER OF DETERMINING A QUERY PARAMETER Q USED FOR INVENTORYING RFID TAGS", by Scott A. Cooper, Christopher J. Diorio, Todd E. Humes, and Vadim P. Lobanov, application Ser. No. 11/210,575, filed with the USPTO on Aug. 24, 2005, and assigned to the same assignee.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

A single RFID reader system may have several antennas. Due to the Tx/Rx chain, the RFID reader system selects, drives, and listens from only one of its antennas at any given time. A further complication arises when a combination of RFID systems is typically deployed and they need to coordinate antennas between themselves to limit interference.

Commonly used static antenna driving techniques may result in wasted time on antennas where no tags are in the field of view, not enough time on antennas where many tags are in their respective fields of view, and increased interference in multiple reader systems where transmission is caused through antennas even when no tags are in the field of view.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to switching antennas in an RFID reader system while performing tag population checks instead of inventorying of all tags within one antennas field of view. Presence of tags is first detected through one antenna. If the number of tags is smaller than a predefined threshold, the system switches to another antenna without inventorying the tags detected in the field of view of the first antenna.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

DETAILED DESCRIPTION

Figure 1:
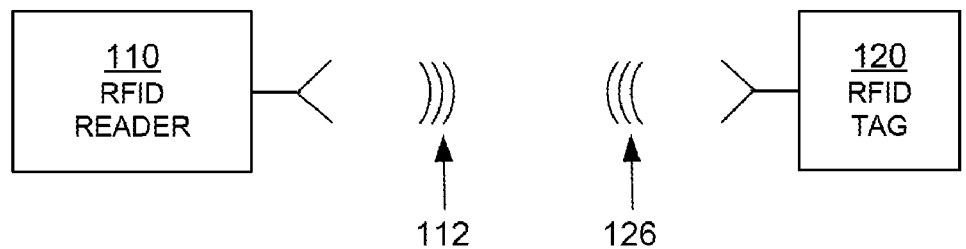
FIG. 1 is a diagram of an example RFID system including an RFID reader communicating with an RFID tag in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Floating Point Gate Array (FPGA), a general purpose micro processor, etc.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
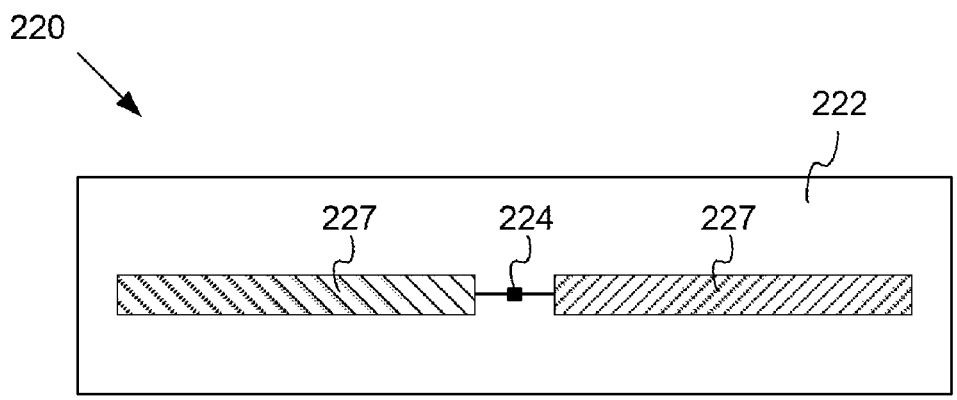
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that, at the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
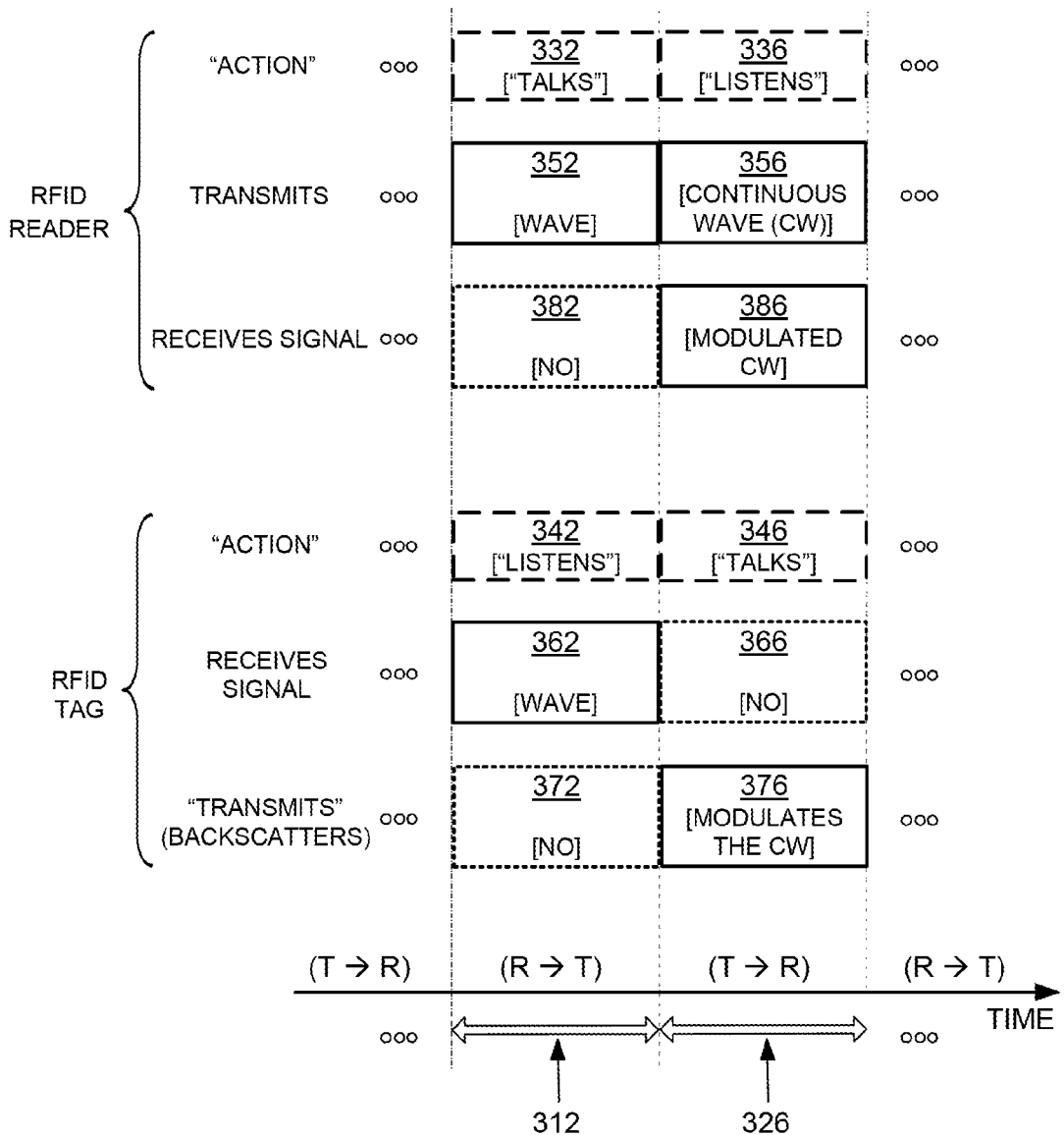
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel. Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
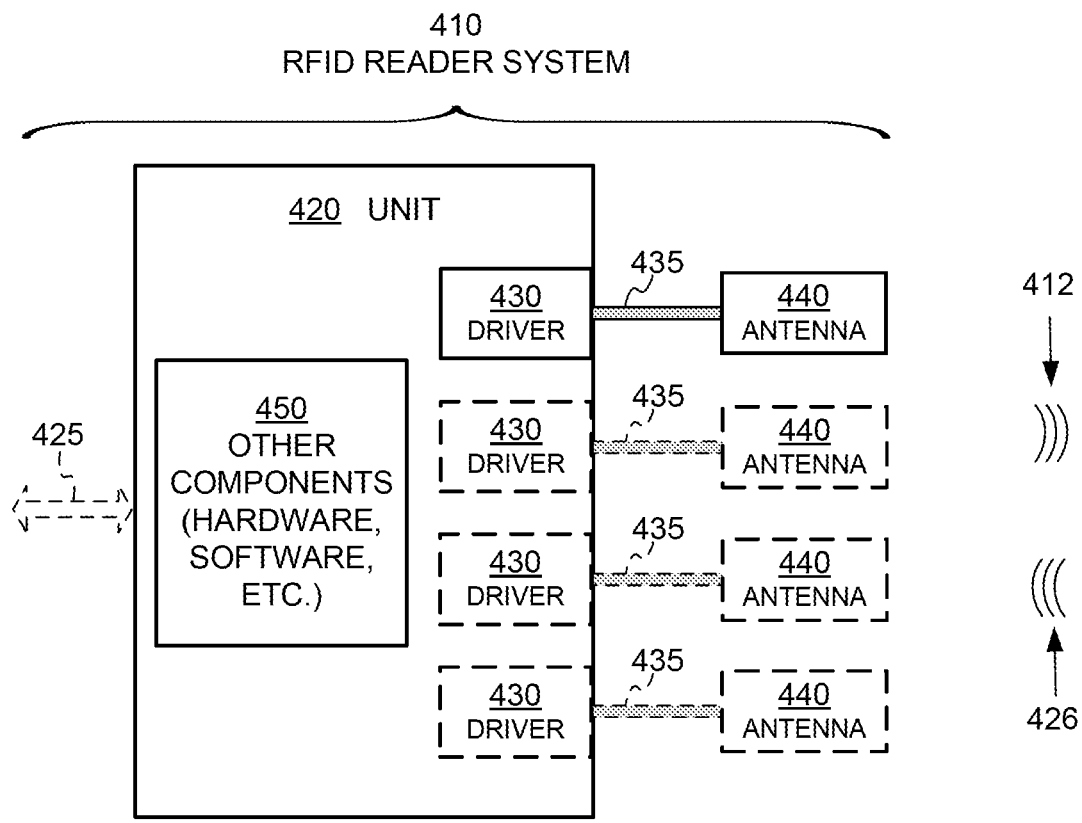
FIG. 4 is a detailed diagram of an example RFID system such as the RFID system of FIG. 1.

FIG. 4 is a block diagram showing a detail of an RFID reader system 410, which can be the same as reader 110 shown in FIG. 1. A unit 420 is also known as a box 420, and has at least one antenna driver 430. In typical embodiments it has four drivers 430. For each driver 430 there is an output, which is typically a coaxial cable plug. Accordingly cables 435 can be attached to the outputs of the provided respective drivers 430, and then the cables 435 can be attached to respective antennas 440.

A driver 430 can send a driving signal, to cause its respective antennas 440 to transmit an RF wave 412, which is analogous to RF wave 112 of FIG. 1. In addition, RF wave 426 can be backscattered from the RFID tags, analogous to RF wave 126 of FIG. 1. Backscattered RF wave 426 becomes a signal sensed by driver 430.

Unit 420 also has other components 450, such as hardware and software, which may be described in more detail later in this document. Components 450 control drivers 430, and as such cause RF wave 412 to be sent, and interpret the sensed backscattered RF wave 426. Optionally and preferably there is a communication link 425 to other equipment, such as computers and the like, for remote operation of system 410.

Figure 5:
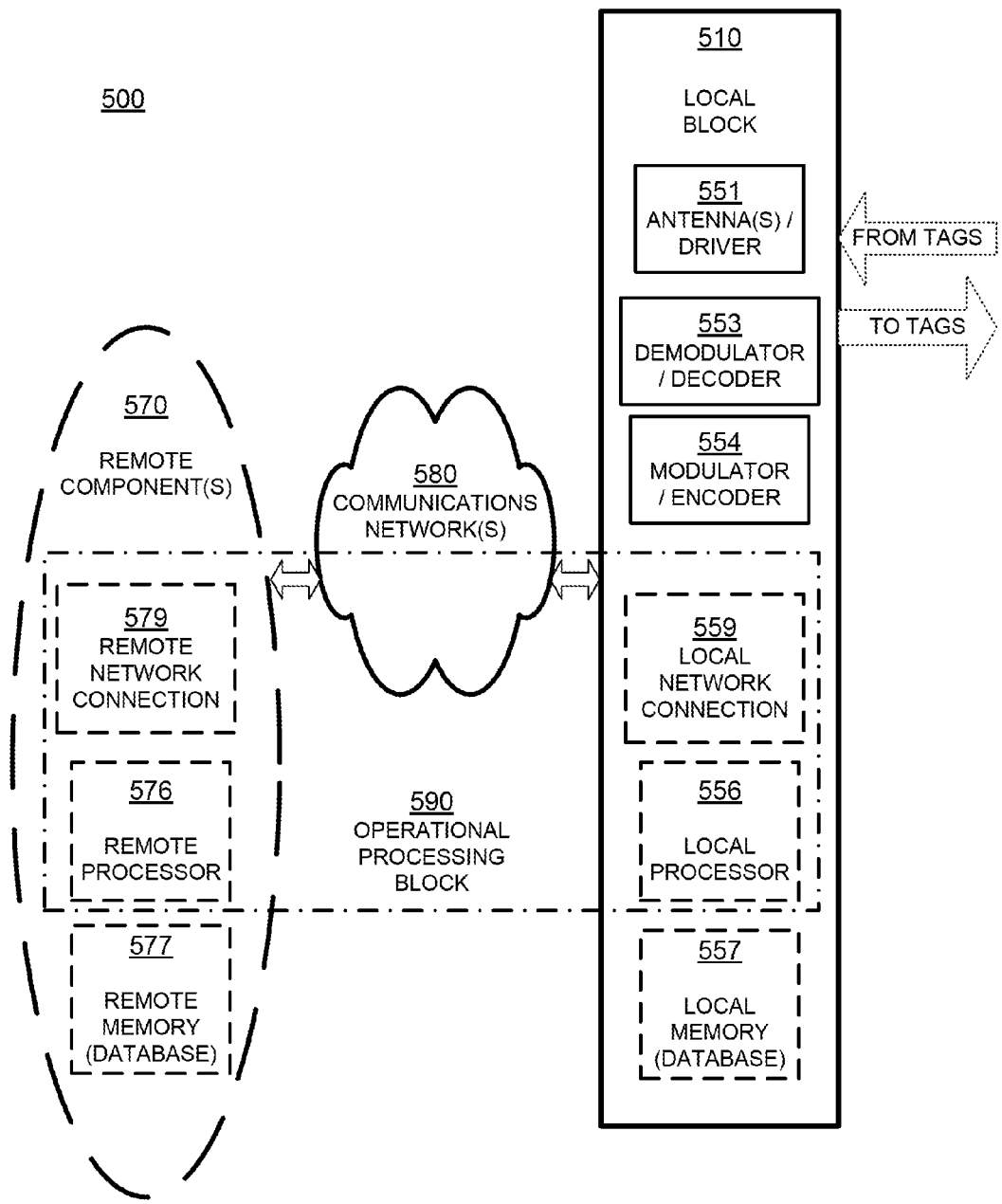
FIG. 5 is a block diagram of an RFID reader system according to embodiments.

FIG. 5 is a block diagram of a whole RFID reader system 500 according to embodiments. System 500 includes a local block 510, and optionally remote components 570. Local block 510 and remote components 570 can be implemented in any number of ways. It will be recognized that reader 110 of FIG. 1 is the same as local block 510, if remote components 570 are not provided. Alternately, reader 110 can be implemented instead by system 500, of which only the local block 510 is shown in FIG. 1. Plus, local block 510 may be unit 420 of FIG. 4.

Local block 510 is responsible for communicating with the tags. Local block 510 includes a block 551 of an antenna and a driver of the antenna for communicating with the tags. Some readers, like that shown in local block 510, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 553 demodulates and decodes backscattered waves received from the tags via antenna block 551. Modulator/encoder block 554 encodes and modulates an RF wave that is to be transmitted to the tags via antenna block 551.

Local block 510 additionally includes an optional local processor 556. Processor 556 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 553, the encoding function in block 554, or both, may be performed instead by processor 556.

Local block 510 additionally includes an optional local memory 557. Memory 557 may be implemented in any number of ways known in the art. Such ways include, by way of examples and not of limitation, nonvolatile memories (NVM), read-only memories (ROM), random access memories (RAM), any combination of one or more of these, and so on. Memory 557, if provided, can include programs for processor 556 to run, if provided.

In some embodiments, memory 557 stores data read from tags, or data to be written to tags, such as Electronic Product Codes (EPCs), Tag Identifiers (TIDs) and other data. Memory 557 can also include reference data that is to be compared to the EPC codes, instructions and/or rules for how to encode commands for the tags, modes for controlling antenna 551, and so on. In some of these embodiments, local memory 557 is provided as a database.

Some components of local block 510 typically treat the data as analog, such as the antenna/driver block 551. Other components such as memory 557 typically treat the data as digital. At some point there is a conversion between analog and digital. Based on where this conversion occurs, a whole reader may be characterized as "analog" or "digital", but most readers contain a mix of analog and digital functionality.

If remote components 570 are indeed provided, they are coupled to local block 510 via an electronic communications network 580. Network 580 can be a Local Area Network (LAN), a Metropolitan Area Network (MAN), a Wide Area Network (WAN), a network of networks such as the internet, and so on. In turn, local block 510 then includes a local network connection 559 for communicating with network 580.

There can be one or more remote component(s) 570. If more than one, they can be located at the same place with each other, or in different places. They can access each other and local block 510 via network 580, or via other similar networks, and so on. Accordingly, remote component(s) 570 can use respective remote network connections. Only one such remote network connection 579 is shown, which is similar to local network connection 559, etc.

Remote component(s) 570 can also include a remote processor 576. Processor 576 can be made in any way known in the art, such as was described with reference to local processor 556.

Remote component(s) 570 can also include a remote memory 577. Memory 577 can be made in any way known in the art, such as was described with reference to local memory 557. Memory 577 may include a local database, and a different database of a Standards Organization, such as one that can reference EPCs.

Of the above-described elements, it is advantageous to consider a combination of these components, designated as operational processing block 590. Block 590 includes those that are provided of the following: local processor 556, remote processor 576, local network connection 559, remote network connection 579, and by extension an applicable portion of network 580 that links connection 559 with connection 579. The portion can be dynamically changeable, etc. In addition, block 590 can receive and decode RF waves received via antenna 551, and cause antenna 551 to transmit RF waves according to what it has processed.

Block 590 includes either local processor 556, or remote processor 576, or both. If both are provided, remote processor 576 can be made such that it operates in a way complementary with that of local processor 556. In fact, the two can cooperate. It will be appreciated that block 590, as defined this way, is in communication with both local memory 557 and remote memory 577, if both are present.

Accordingly, block 590 is location agnostic, in that its functions can be implemented either by local processor 556, or by remote processor 576, or by a combination of both. Some of these functions are preferably implemented by local processor 556, and some by remote processor 576. Block 590 accesses local memory 557, or remote memory 577, or both for storing and/or retrieving data.

Reader system 500 operates by block 590 generating communications for RFID tags. These communications are ultimately transmitted by antenna block 551, with modulator/encoder block 554 encoding and modulating the information on an RF wave. Then data is received from the tags via antenna block 551, demodulated and decoded by demodulator/decoder block 553, and processed by processing block 590.

Figure 6:
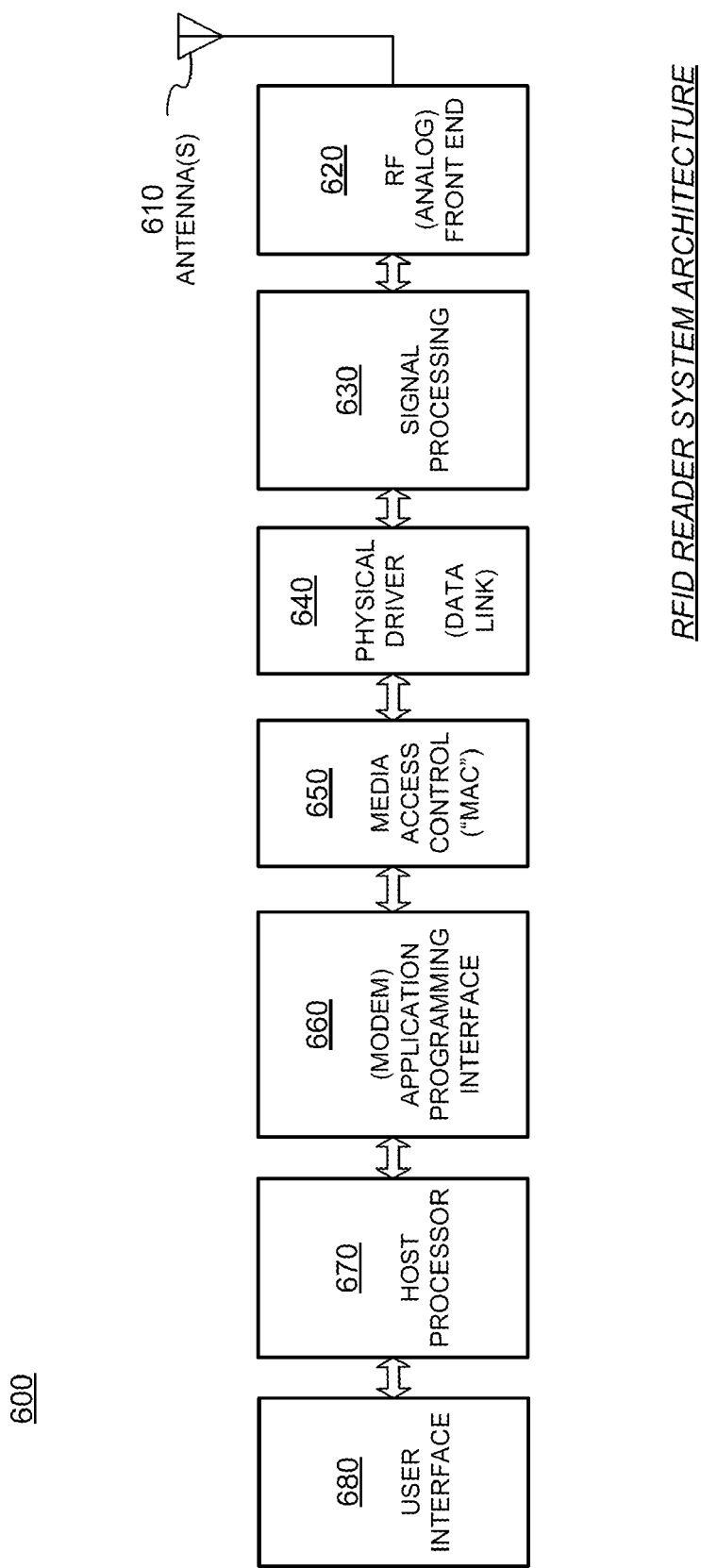
FIG. 6 is a block diagram illustrating major functional blocks of an RFID reader system.

FIG. 6 is a block diagram illustrating an overall architecture of a RFID reader system 600 according to embodiments. It will be appreciated that system 600 is considered subdivided into modules or components. Each of these modules may be implemented by itself, or in combination with others. It will be recognized that some aspects are parallel with those of FIG. 5. In addition, some of them may be present more than once.

RFID reader system 600 includes one or more antennas 610, and an RF Front End 620, for interfacing with antenna(s) 610. These can be made as described above. In addition, Front End 620 typically includes analog components.

System 600 also includes a Signal Processing module 630. In this embodiment, module 630 exchanges waveforms with Front End 620, such as I and Q waveform pairs. In some embodiments, signal processing module 630 is implemented by itself in an FPGA.

System 600 also includes a Physical Driver module 640, which is also known as Data Link. In this embodiment, module 640 exchanges bits with module 630. Data Link 640 can be the stage associated with framing of data. In one embodiment, module 640 is implemented by a Digital Signal Processor.

System 600 additionally includes a Media Access Control module 650, which is also known as MAC layer. In this embodiment, module 650 exchanges packets of bits with module 640. MAC layer 650 can be the stage for making decisions for sharing the medium of wireless communication, which in this case is the air interface. Sharing can be between reader system 600 and tags, or between system 600 with another reader, or between tags, or a combination. In one embodiment, module 650 is implemented by a Digital Signal Processor.

System 600 moreover includes an Application Programming Interface module 660, which is also known as API, Modem API, and MAPI. In some embodiments, module 660 is itself an interface for a user.

System 600 further includes a host processor 670. Processor 670 exchanges signals with MAC layer 650 via module 660. In some embodiments, host processor 670 is not considered as a separate module, but one that includes some of the above-mentioned modules of system 600. A user interface 680 is coupled to processor 670, and it can be manual, automatic, or both.

Host processor 670 can include applications for system 600. In some embodiments, elements of module 660 may be distributed between processor 670 and MAC layer 650.

It will be observed that the modules of system 600 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 610 as signals, which are in turn processed successively by the various modules in the chain. Processing can terminate in any one of the modules. In a transmitting mode, initiation can be in any one of these modules. That, which is to be transmitted becomes ultimately signals for antenna(s) 610 to transmit as wireless waves.

The architecture of system 600 is presented for purposes of explanation, and not of limitation. Its particular subdivision into modules need not be followed for creating embodiments according to the invention. Furthermore, the features of the invention can be performed either within a single one of the modules, or by a combination of them.

As mentioned previously, a single RFID reader system may have several antennas. Due to the Tx/Rx chain, the RFID reader system selects, drives, and listens from only one of its antennas at any given time. Furthermore, a combination of RFID systems is typically deployed and they need to coordinate antennas between themselves to limit interference.

To complicate the design of multiple antenna reader systems, antennas may be facing different directions. Time spent on an antenna that views no tags (while the other antenna has tags in view) represents missed performance (missed opportunity to identify tags). Even though the antennas could all be facing at the same location, different ones view different groups of tags, and may have differential effectiveness. For example, a dock door with two antennas at different heights on same side of the door connected to the same reader. In such a scenario, tag placement in the pallet would define which antenna is more likely to find which tags. Some tags may only be read by one of the antennas.

Moreover, synchronizing antennas between readers requires precision to limit system downtime. Synchronizing clocks accurately on separate processors is a complex problem. In addition, readers that view no tags and still transmit using their antennas increase the noise floor in a system deployment unnecessarily. This may cause degradation in the performance of other readers in the deployment which do view tags. Finally, antenna switching may need to be controlled at the speed of the air protocol. With the increased speed of new generation air protocols, increased demands are put on antenna switching.

Some of the solutions to challenges of static antenna switching mechanisms include user specifying time spent per antenna, user specifying order in which to cycle through antennas, or user specifying external triggers to start antenna operation. These approaches have their own limitations such as users or installers having to configure the reader(s) at time of deployment for a specific scenario, which may be costly and require tuning if scenario changes (e.g. conveyor belt speed changes, use of humans or forklifts for pushing pallets through the field of view of readers, etc.).

Additionally, tags may not be rapidly detected in a particular antenna read zone causing delay in seeing tags for the first time. Antennas may be grouped into "sources" (e.g. in a symmetrical deployment like a dock door, each of the 2 sources may be given same amount of time to see tags). This effectively gives a 50% duty cycle per door even if no tags are in that door. External triggers are also challenging to deploy and may break easily.

Figure 7A:
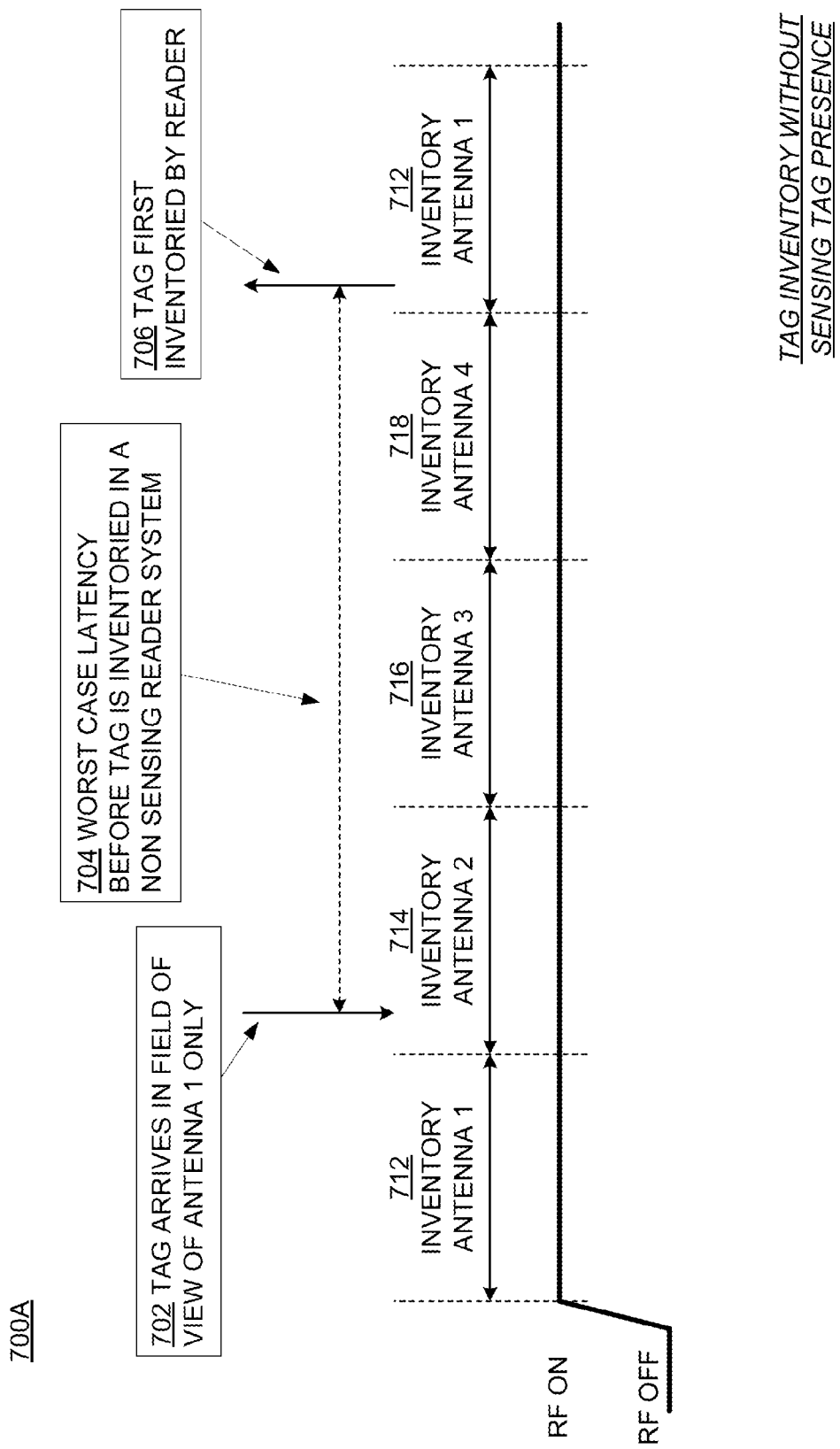
FIG. 7A is a diagram illustrating an operation of an RFID reader system with multiple antennas and a conventional antenna switching algorithm which, however, can delay sensing tag presence.

FIG. 7A is a diagram illustrating an operation of an RFID reader system with multiple antennas and a conventional antenna switching algorithm which, however, can delay sensing tag presence.

Diagram 700A illustrates one of the problems with conventional antenna switching methods, where commonly a predetermined time is allocated to each antenna associated with the RFID reader system.

It should be noted, while the term antenna is used throughout this document, the principles described herein are applicable to reader systems where multiple antennas are used in connection with RF ports. For example, a reader may employ four RF ports with two antennas attached to each RF port. In that scenario (and similar ones) the same principles described for the embodiments below apply to the RF ports as they would to the antennas.

Referring back to diagram 700A, a conventional RFID reader system allocates equal periods of time to four antennas (712 for antenna 1, 714 for antenna 2, 716 for antenna 3, 718 for antenna 4, and so on). Thus, period 712 is dedicated to inventorying of tags in the field of view of antenna 1. The reader switches to antenna 2 from antenna 1 regardless of whether any tags are found or whether the inventorying of found tags is completed.

As discussed previously, tags are not always stationary. In applications such as dock doors, tags may be moving in and out of the field of view of one of the antennas constantly. Hence, a problem of latency is encountered. As shown by reference numeral 704, in a worst case latency scenario, a tag may arrive in the field of view of antenna 1 (702) shortly after the reader switches from antenna 1 to antenna 2. The arriving tag may be inventoried (706) only after the reader completes checking all other antennas and switches back to antenna 1 (712). Thus, the inventorying of the tag is delayed by almost the period it takes the reader to check three antennas.

Figure 7B:
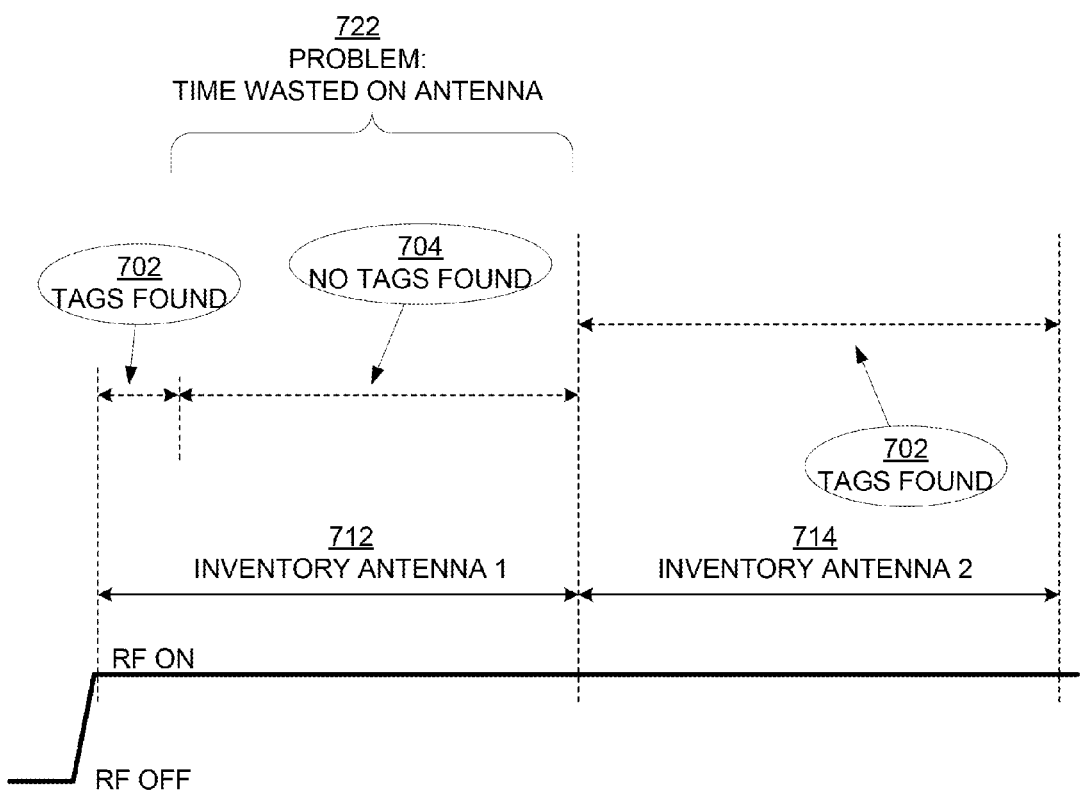
FIG. 7B is a diagram illustrating an operation of an RFID reader system with multiple antennas and a conventional antenna switching algorithm which, however, might allocate time poorly among two of them.

FIG. 7B is a diagram illustrating an operation of an RFID reader system with multiple antennas and a conventional antenna switching algorithm which, however, might allocate time poorly among two of them.

Diagram 700B illustrates another aspect of the problem(s) with conventional antenna switching mechanisms at antenna level. Upon turning on the RF signal, a first fixed period 712 is dedicated to inventorying tags within the field of view of antenna 1. However, a few tags may be found at the beginning of the fixed period 712 as shown by reference numeral 702 and the inventory process completed before period 712 ends. If no additional tags are found (704), the remainder of period 712 is wasted time on antenna 1 as illustrated by reference numeral 722.

Furthermore, a number of tags may be found in the field of view of antenna 2 during period 714. If the number of tags is such that their inventory cannot be completed within period 714, the inventory process is cut off at the end of 714 and the reader switches to another antenna forcing the inventory process to begin either from the start. Some readers may implement complicated algorithms to remember the tags during the first attempt to inventory through antenna 2, but that approach is not only expensive in terms of processing resources, but may not be reliable when tags are constantly moving in and out of the field of view.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as a combination of hardware and software. It is advantageous to consider such a system as subdivided into components or modules. A person skilled in the art will recognize that some of these components or modules can be implemented as hardware, some as software, some as firmware, and some as a combination.

Methods are now described more particularly according to embodiments.

Figure 8:
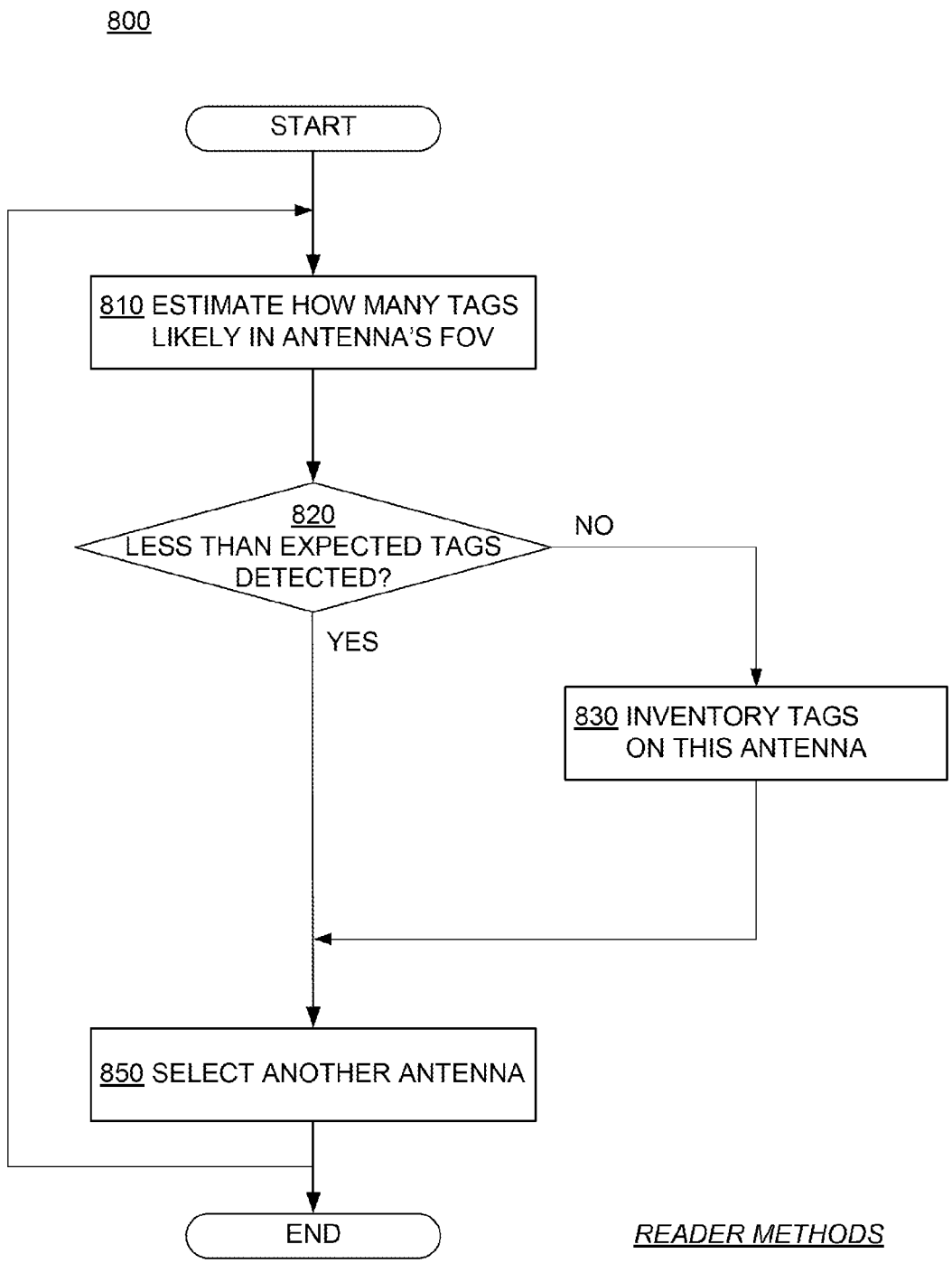
FIG. 8 is a flowchart of an antenna port switching process by estimating how many tags are in an RFID reader system antenna's field of view according to embodiments.

FIG. 8 is a flowchart of an antenna port switching process by estimating how many tags are in an RFID reader system antenna's field of view according to embodiments.

Process 800 begins at operation 810, where an estimate of how many tags there are in an antenna's field of view is performed by the reader. This may be performed by tag population check which includes transmitting a signal and listening to determine if any tags are responding to the signal or not.

The number of present tags may also be estimated by determining a power of the tag response signals and comparing that to an expected power of a single tag response.

According to a next decision operation 820, a determination is made whether fewer than a predefined number of expected tag replies are detected. If more than the expected number of tags are detected, processing advances to operation 830, where tags in the field of view of the antenna are inventoried.

According to a next operation 850 following fewer than the expected number of tags having been detected at decision operation 820 or operation 830, another antenna is selected for further operations.

After completing operation 850, the process may return to operation 810 for performing another tag population estimate through the selected other antenna. As discussed below, a reader system may include a plurality of antennas and the antenna selection may be based on an order of antennas, a pseudo-random algorithm, user specification, and the like.

Figure 9A:
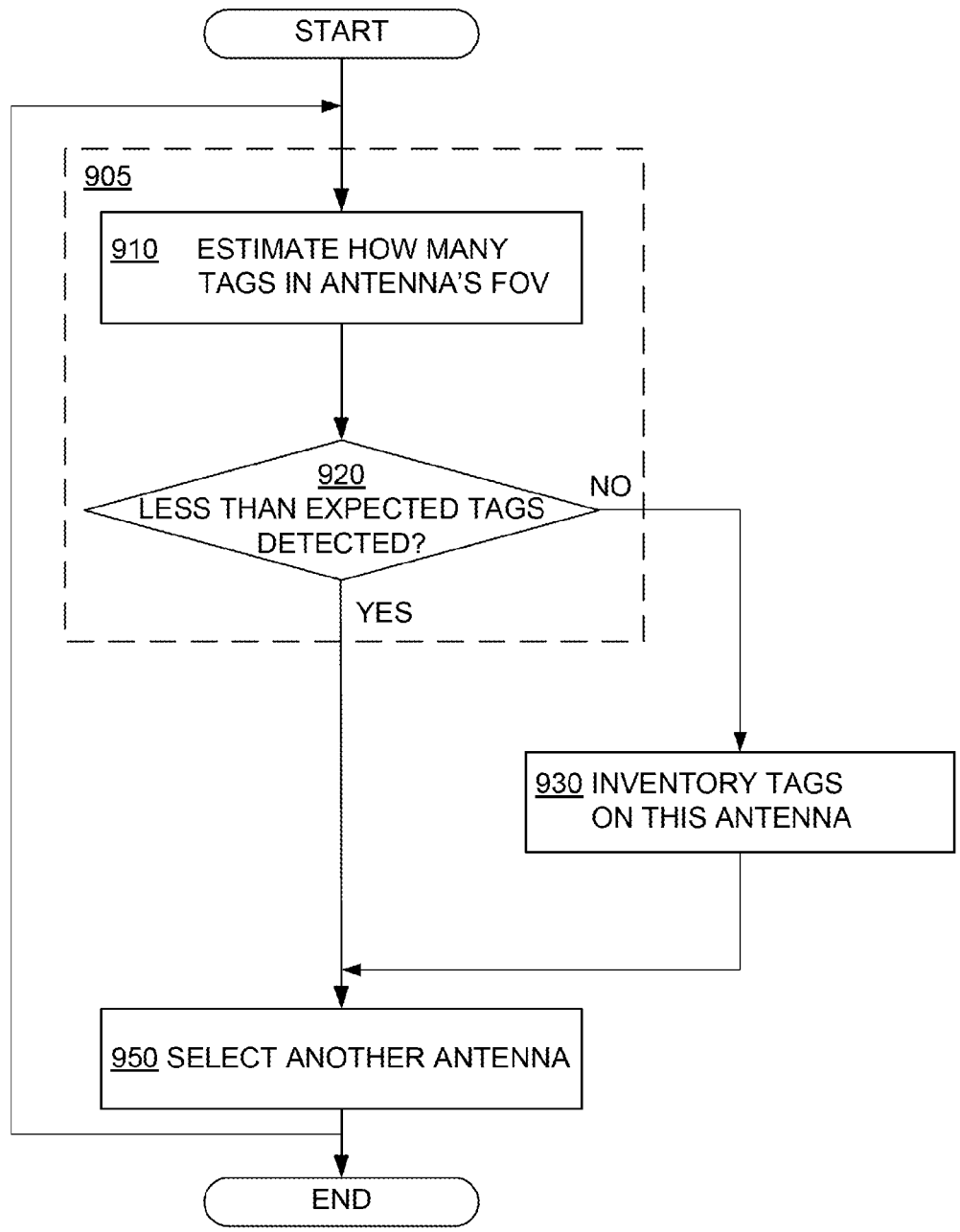
FIG. 9A is a flowchart of a further antenna port switching process by detecting tag presence in an RFID reader system employing a non-persistent session (S0) according to embodiments.

FIG. 9A is a flowchart of a further antenna port switching process by detecting tag presence in an RFID reader system employing a non-persistent session according to embodiments.

Some of the operations of process 900A are similar to likewise numbered operations of process 800. Process 900A begins with two operations grouped together as 905 representing the tag population check employing a non-persistent session.

According to operation 910, a number of tags within the antenna's field of view is estimated.

According to a next decision operation 920, a determination is made whether fewer than an expected number of tags are detected.

If more than the expected number of tag responses are detected, those tags are inventoried at operation 930.

According to a next operation 950 following fewer than expected number of tag detection at decision operation 920 or operation 930, another antenna is selected for further operations. After completing operation 950, the process may return to operation 910 for performing another tag population estimate through the selected other antenna.

Figure 9B:
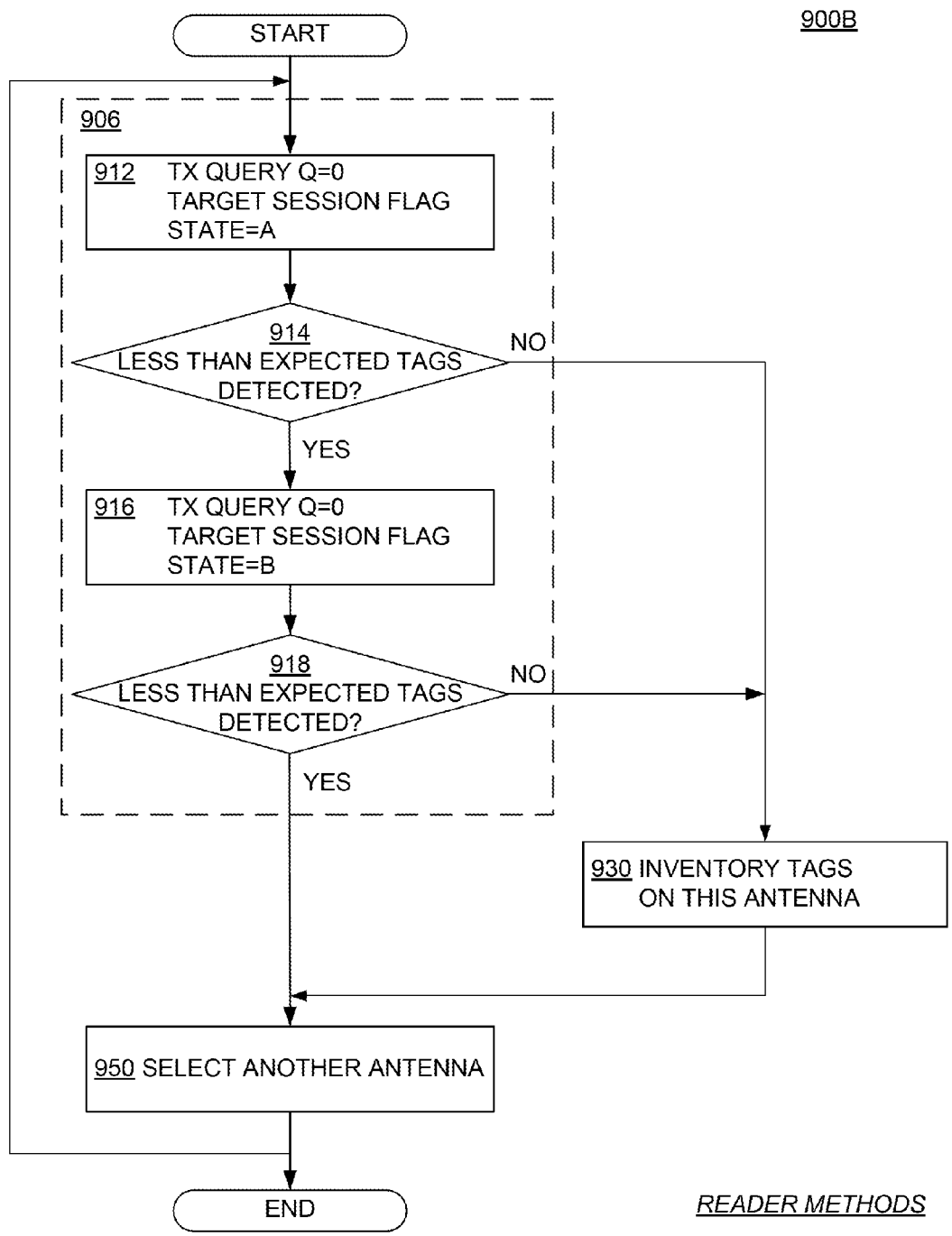
FIG. 9B is a flowchart of another antenna port switching process by detecting tag presence in an RFID reader system employing a persistent session (S2) according to embodiments.

FIG. 9B is a flowchart of another antenna port switching process by detecting tag presence in an RFID reader system employing a persistent session according to embodiments.

Some of the operations of process 900B are similar to likewise numbered operations of processes 800 and 900A. Process 900B begins with four operations grouped together as 906 representing the tag population check employing a persistent session. The persistent session is the same session as the inventory process.

According to a first operation 912, a query command with a Q-parameter of "0" value is transmitted for detecting tags. In a persistent session, tag responses may be directed to target session flag state A or B. Therefore, the first query command is directed at target session flag state A.

According to a next decision operation 914, a determination is made whether fewer than an expected number of tag replies are detected for target session flag state A. If more tag replies than the expected number are detected, the tags may be inventoried at next operation 930. Otherwise, processing advances to operation 916.

According to a next operation 916, another query command with a Q-parameter of "0" value is transmitted for target session flag state B.

According to a next decision operation 918, a determination is made whether less than the expected number of tag replies were detected for target session flag state B. If more tag replies than the expected number were detected, the tags may be inventoried at next operation 930. Otherwise, processing advances to operation 950.

According to a next operation 950 following detection of fewer than expected tags at decision operation 918 or operation 930, another antenna is selected for further operations. After completing operation 950, the process may return to operation 910 for performing another tag population estimate through the selected other antenna.

The operations included in processes 800, 900A, and 900B are for illustration purposes. Antenna switching upon detecting fewer than an expected number of tags may be implemented by similar processes with fewer or additional steps, as well as in different order of operations using the principles described herein.

According to some embodiments, a method for an RFID reader system coupled to at least a first antenna and a second antenna includes causing the first antenna to radiate a first signal for estimating whether any tags are present in the first antenna's field of view, and causing the second antenna to radiate a second signal for estimating whether any tags are present in the second antenna's field of view if fewer than a preset number of tags are estimated in the first antenna's field of view. Otherwise the method includes inventorying tags estimated in the first antenna's field of view.

The preset number may be learned by the reader based on tag responses. If fewer than the preset number of tags are estimated in the second antenna's field of view, the reader system may cause a third antenna coupled to the RFID reader system to radiate a third signal for estimating whether any tags are present in the third antenna's field of view. Otherwise, the reader system may inventory tags estimated in the second antenna's field of view.

The second signal may be radiated regardless of whether any tags are estimated as present in the first antenna's field of view or responsive to estimating that no tags are present in the first antenna's field of view. The first tags may also be estimated as present in the first antenna's field of view, and the second signal radiated without addressing individually the first tags.

The second antenna may be selected before completing causing the first antenna to radiate such that no signal is radiated from the first antenna beyond the first signal. Also, selecting the second antenna may be delayed until an operation for a specific tag is completed.

According to another embodiment, the tag operation may be completed when a predefined criterion is satisfied. The predefined criterion may include one or more of a decision based on completion of an inventory operation, a decision based on an expiration of a time out period, or a decision based on a predefined Q parameter value. The Q parameter value may be learned by the RFID reader system based on tag responses or dictated by the first signal and have a value of at least 2.

According to further embodiments, the first signal may be for performing a partial query operation to detect the presence of the tags such that if one of a valid preamble and a collision is detected, a tag is estimated, else no tag is estimated. The second signal may be radiated regardless of whether any tags are estimated as present in the first antenna's field of view. The second signal may also be radiated responsive to estimating that no tags are present in the first antenna's field of view.

According to yet other embodiments, first tags, fewer than the preset number, may be estimated as present in the first antenna's field of view, and the second signal may be radiated without addressing individually the first tags.

The second antenna may be selected among a plurality of antennas associated with the RFID reader system based on a first predefined algorithm, an order of available antennas, or by random selection, in which the selection is different depending on whether any tags are sensed through the first antenna. If no tags are estimated, a third antenna may be selected according to the first algorithm or a second algorithm.

Figure 10:
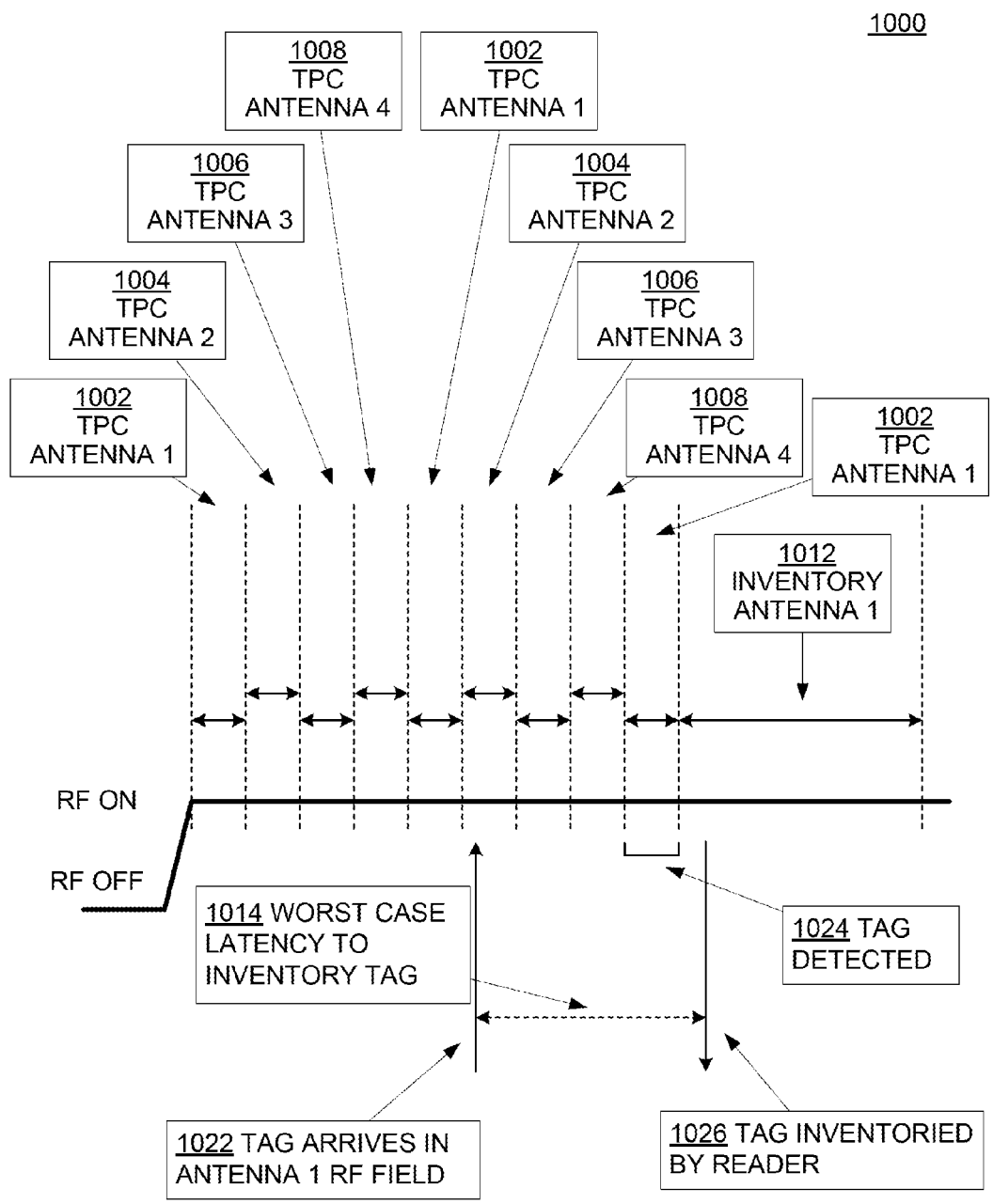
FIG. 10 is a diagram illustrating an operation of an RFID reader system with multiple antennas and an antenna switching algorithm according to embodiments.

FIG. 10 is a diagram illustrating an operation of an RFID reader system with multiple antennas and an antenna switching algorithm according to embodiments.

When tag population check is performed for each antenna instead of statically assigned time for inventorying tags regardless of whether any tags are estimated, time spent on each antenna is significantly reduced in the absence of tags in each antenna's field of view.

In diagram 1000, the reduction in time spent on each antenna is illustrated by the TPC periods 1002 through 1008. In periods 1002 through 1008, the TPC may determine to tags have replied or fewer than an expected number have replied. Thus the reader system switches to another antenna.

Following the worst case latency scenario discussed in FIG. 7A, a tag may arrive in antenna 1's field of view (1022) shortly after the reader has switched to antenna 2. The arriving tag is detected when the reader completes checks through the other antennas per its antenna selection algorithm and returns to antenna 1 as shown by reference numeral 1024. The tag is then inventoried through antenna 1 (1026), when the reader switches from tag population check mode to inventory mode (1012) on antenna 1. The worst case latency as illustrated by reference numeral 1014 is significantly reduced compared to the scenario shown in FIG. 7A.

Figure 11:
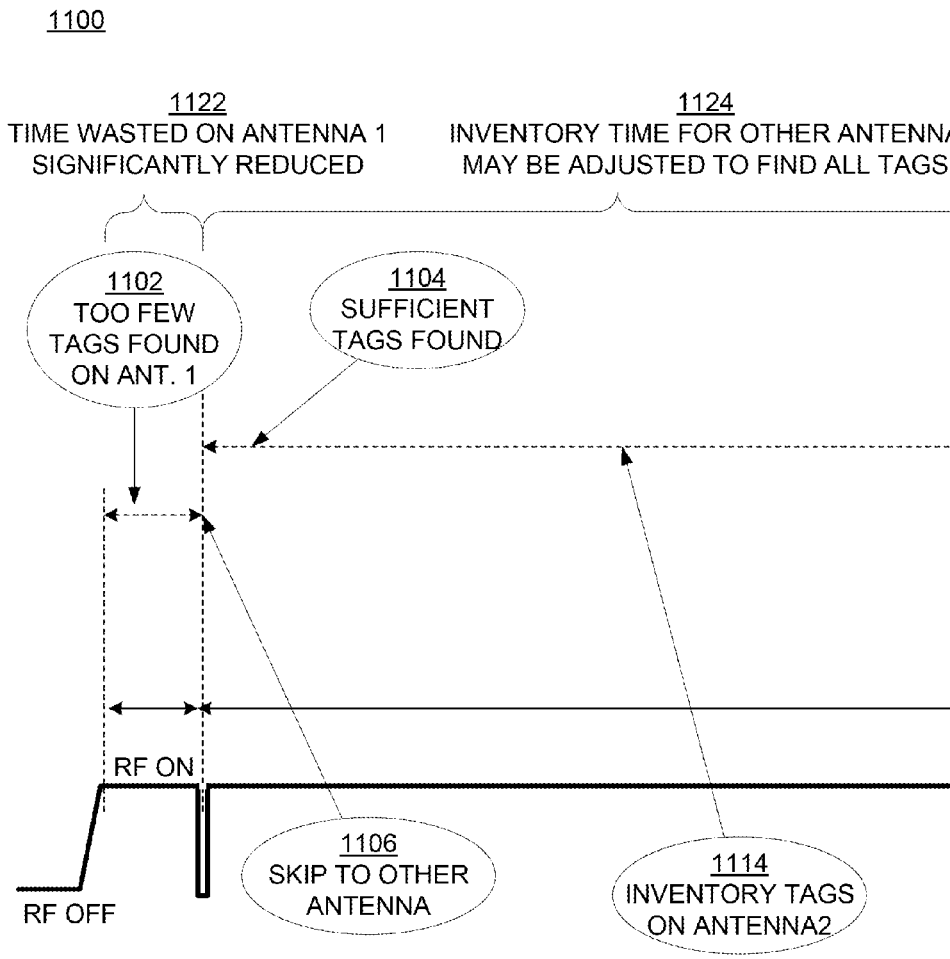
FIG. 11 is a diagram illustrating an operation of an RFID reader system with multiple antennas and an antenna switching algorithm for two of its antennas that switches antennas based on detection of too few tags according to embodiments.

FIG. 11 is a diagram illustrating an operation of an RFID reader system with multiple antennas and an antenna switching algorithm for two of its antennas that switches antennas based on detection of too few tags according to embodiments.

According to the example scenario shown in diagram 1100, during a TPC process through a first antenna too few tags are found (1102). So, the reader switches to another antenna (1106) reducing time wasted on the first antenna significantly (1122). Following a TPC or query process, sufficient tags are found (1104) in the field of view of the second antenna.

The tags found in the field of view of the second antenna may then be inventoried. According to some embodiments, the time allocated to the second antenna may be adjusted (1124) to allow completion of the inventorying of all tags found in the field of view of the second antenna.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A method for an RFID reader system coupled to at least a first antenna and a second antenna, comprising:
   causing the first antenna to radiate a first signal for estimating how many tags are likely present in the first antenna's field of view; and
   if fewer than a preset number of tags are estimated in the first antenna's field of view, causing the second antenna to radiate a second signal for estimating how many tags are likely present in the second antenna's field of view,
   else inventorying tags estimated in the first antenna's field of view.

2. The method of claim 1, in which
   the preset number is learned by the reader based on tag responses.

3. The method of claim 1, in which
   the second signal is radiated regardless of whether any tags are estimated as present in the first antenna's field of view.

4. The method of claim 1, in which
   the second signal is radiated responsive to estimating that no tags are present in the first antenna's field of view.

5. The method of claim 1, in which
   first tags are estimated as present in the first antenna's field of view, and
   the second signal is radiated without addressing individually the first tags.

6. The method of claim 1, further comprising:
   determining a power level of received tag responses;
   comparing the determined power level to an expected power level of a single tag response; and
   estimating how many tags are likely present based on the comparison.

7. The method of claim 1, further comprising:
   if fewer than the preset number of tags are estimated in the second antenna's field of view, then causing a third antenna coupled to the RFID reader system to radiate a third signal for estimating how many tags are likely present in the third antenna's field of view,
   else inventorying tags estimated in the second antenna's field of view.

8. The method of claim 1, further comprising:
   selecting the second antenna before completing causing the first antenna to radiate such that no signal is radiated from the first antenna beyond the first signal.

9. The method of claim 8, in which
   selecting the second antenna is delayed until an operation for a specific tag is complete.

10. The method of claim 9, in which
    the tag operation is completed when a predefined criterion is satisfied.

11. The method of claim 10, in which
    the predefined criterion includes at least one of:
       a decision based on completion of an inventory operation; and
       a decision based on an expiration of a time out period.

12. The method of claim 10, in which
    the predefined criterion further includes:
       a decision based on a predefined Q parameter value.

13. The method of claim 12, in which
    the Q parameter value is one of: learned by the RFID reader system based on tag responses and dictated by the first signal.

14. The method of claim 12, in which
    the Q parameter has a value of at least 2.

15. The method of claim 1, in which
    the first signal is for performing a partial query operation to estimate the presence of the tags such that if one of a valid preamble and a collision is detected, a tag is estimated, else no tag is estimated.

16. The method of claim 1, in which
    first tags, fewer than the preset number, are estimated as present in the first antenna's field of view, and
    the second signal is radiated without addressing individually the first tags.

17. The method of claim 1, further comprising:
    selecting the second antenna among a plurality of antennas associated with the RFID reader system based on one of: a first predefined algorithm, an order of available antennas, and by random selection, in which the selection is different depending on whether any tags are sensed through the first antenna.

18. The method of claim 17, in which
    if no tags are sensed, selecting a third antenna according to one of the first algorithm and a second algorithm.

19. An RFID reader system coupled to at least a first antenna and a second antenna, comprising:
    a control circuit configured to:
    cause the first antenna to radiate a first signal for estimating whether any tags are present in the first antenna's field of view; and
    if fewer than a preset number of tags are estimated in the first antenna's field of view, cause the second antenna to radiate a second signal for estimating whether any tags are present in the second antenna's field of view,
    else inventory tags estimated in the first antenna's field of view.

20. The RFID reader system of claim 19, in which
    the preset number is learned by the reader based on tag responses.

21. The RFID reader system of claim 19, in which the control circuit is further configured to:
    if fewer than the preset number of tags are estimated in the second antenna's field of view, then cause a third antenna coupled to the RFID reader system to radiate a third signal for estimating whether any tags are present in the third antenna's field of view,
    else inventory tags estimated in the second antenna's field of view.

22. The RFID reader system of claim 19, in which the control circuit is further configured to:
    select the second antenna before completing causing the first antenna to radiate such that no signal is radiated from the first antenna beyond the first signal.

23. The RFID reader system of claim 22, in which
    selecting the second antenna is delayed until an operation for a specific tag is completed.

24. The RFID reader system of claim 23, in which
    the tag operation is completed when a predefined criterion is satisfied.

25. The RFID reader system of claim 24, in which
    the predefined criterion includes at least one of:
       a decision based on completion of an inventory operation; and
       a decision based on an expiration of a time out period.

26. The RFID reader system of claim 24, in which
the predefined criterion further includes:
a decision based on a predefined Q parameter value.
27. The RFID reader system of claim 26, in which
the Q parameter value is one of: learned by the RFID reader system based on tag responses and dictated by the first signal.
28. The RFID reader system of claim 27, in which
the Q parameter has a value of at least 2.
29. The RFID reader system of claim 19, in which
the first signal is for performing a partial query operation to estimate the presence of the tags such that if one of a valid preamble and a collision is detected, a tag is estimated, else no tag is estimated.
30. The RFID reader system of claim 19, in which
the second signal is radiated regardless of whether any tags are estimated as present in the first antenna's field of view.
31. The RFID reader system of claim 19, in which
the second signal is radiated responsive to estimating that no tags are present in the first antenna's field of view.
32. The RFID reader system of claim 19, in which
first tags, fewer than the preset number, are estimated as present in the first antenna's field of view, and
the second signal is radiated without addressing individually the first tags.
33. The RFID reader system of claim 19, in which the control circuit is further configured to:
select the second antenna among a plurality of antennas associated with the RFID reader system based on one of: a first predefined algorithm, an order of available antennas, and by random selection, in which the selection is different depending on whether any tags are sensed through the first antenna.
34. The RFID reader system of claim 33, in which
if no tags are estimated, selecting a third antenna according to one of the first algorithm and a second algorithm.
35. The RFID reader system of claim 19, in which the control circuit is further configured to:
determine a power level of received tag responses;
compare the determined power level to an expected power level of a single tag response; and
estimate how many tags are likely present based on the comparison.
36. A Digital Signal Processing (DSP) chip for an RFID reader coupled to at least a first antenna and a second antenna, the DSP chip comprising:
circuitry configured to:
cause the first antenna to radiate a first signal for estimating whether any tags are present in the first antenna's field of view; and
if fewer than a preset number of tags are estimated in the first antenna's field of view, cause the second antenna to radiate a second signal for estimating whether any tags are present in the second antenna's field of view,
else inventory tags estimated in the first antenna's field of view.
37. The DSP chip of claim 36, in which
the preset number is learned by the reader based on tag responses.
38. The DSP chip of claim 36, in which the circuitry is further configured to:
if fewer than the preset number of tags are estimated in the second antenna's field of view, then cause a third antenna coupled to the RFID reader system to radiate a third signal for estimating whether any tags are present in the third antenna's field of view,
else inventory tags estimated in the second antenna's field of view.
39. The DSP chip of claim 36, in which the circuitry is further configured to:
select the second antenna before completing causing the first antenna to radiate such that no signal is radiated from the first antenna beyond the first signal.
40. The DSP chip of claim 39, in which
selecting the second antenna is delayed until a tag operation is completed.
41. The DSP chip of claim 40, in which
the tag operation is completed when a predefined criterion is satisfied.
42. The DSP chip of claim 41, in which
the predefined criterion includes at least one of:
a decision based on completion of an inventory operation; and
a decision based on an expiration of a time out period.
43. The DSP chip of claim 41, in which
the predefined criterion further includes:
a decision based on a predefined Q parameter value.
44. The DSP chip of claim 43, in which
the Q parameter value is one of: learned by the RFID reader system based on tag responses and dictated by the first signal.
45. The DSP chip of claim 43, in which
the Q parameter has a value of at least 2.
46. The DSP chip of claim 36, in which
the first signal is for performing a partial query operation to estimate the presence of the tags such that if one of a valid preamble and a collision is detected, a tag is estimated, else no tag is estimated.
47. The DSP chip of claim 36, in which
the second signal is radiated one of: regardless of whether any tags are estimated as present in the first antenna's field of view and responsive to estimating that no tags are present in the first antenna's field of view.
48. The DSP chip of claim 36, in which
first tags, fewer than the preset number, are estimated as present in the first antenna's field of view, and
the second signal is radiated without addressing individually the first tags.
49. The DSP chip of claim 36, in which the circuitry is further configured to:
select the second antenna among a plurality of antennas associated with the RFID reader system based on one of: a first predefined algorithm, an order of available antennas, and by random selection, in which the selection is different depending on whether any tags are sensed through the first antenna.
50. The DSP chip of claim 49, in which
if no tags are estimated, selecting a third antenna according to one of the first algorithm and a second algorithm.
51. The DSP chip of claim 36, in which the circuitry is further configured to:
determine a power level of received tag responses:
compare the determined power level to an expected power level of a single tag response; and
estimate how many tags are likely present based on the comparison.
52. A computer-readable medium with computer-executable instructions encoded thereon for controlling operations of an RFID reader system coupled to at least a first antenna and a second antenna, the instructions comprising:
causing the first antenna to radiate a first signal for estimating whether any tags are present in the first antenna's field of view; and if fewer than a preset number of tags are estimated in the first antenna's field of view, causing the second antenna to radiate a second signal for estimating whether any tags are present in the second antenna's field of view, else inventorying tags estimated in the first antenna's field of view.

53. The computer-readable medium of claim 52, in which the preset number is learned by the reader based on tag responses.

54. The computer-readable medium of claim 52, in which the instructions further comprise:

if fewer than the preset number of tags are estimated in the second antenna's field of view, then causing a third antenna coupled to the RFID reader system to radiate a third signal for estimating whether any tags are present in the third antenna's field of view, else inventorying tags estimated in the second antenna's field of view.

55. The computer-readable medium of claim 52, in which the second antenna is selected before completing causing the first antenna to radiate such that no signal is radiated from the first antenna beyond the first signal.

56. The computer-readable medium of claim 55, in which selecting the second antenna is delayed until an operation for a specific tag is completed.

57. The computer-readable medium of claim 56, in which the tag operation is completed when a predefined criterion is satisfied.

58. The computer-readable medium of claim 57, in which the predefined criterion includes at least one of:

a decision based on completion of an inventory operation; and a decision based on an expiration of a time out period.

59. The computer-readable medium of claim 57, in which the predefined criterion further includes:

a decision based on a predefined Q parameter value.

60. The computer-readable medium of claim 59, in which the Q parameter value is one of: learned by the RFID reader system based on tag responses and dictated by the first signal.

61. The computer-readable medium of claim 59, in which the Q parameter has a value of at least 2.

62. The computer-readable medium of claim 52, in which the first signal is for performing a partial query operation to estimate the presence of the tags such that if one of a valid preamble and a collision is detected, a tag is estimated, else no tag is estimated.

63. The computer-readable medium of claim 52, in which the second signal is radiated one of: regardless of whether any tags are estimated as present in the first antenna's field of view and responsive to estimating that no tags are present in the first antenna's field of view.

64. The computer-readable medium of claim 52, in which first tags, fewer than the preset number, are estimated as present in the first antenna's field of view, and the second signal is radiated without addressing individually the first tags.

65. The computer-readable medium of claim 52, in which the instructions further comprise:

selecting the second antenna among a plurality of antennas associated with the RFID reader system based on one of: a first predefined algorithm, an order of available antennas, and by random selection, in which the selection is different depending on whether any tags are sensed through the first antenna.

66. The computer-readable medium of claim 65, in which if no tags are estimated, selecting a third antenna according to one of the first algorithm and a second algorithm.

67. The computer-readable medium of claim 52, in which the instructions further comprise:

determining a power level of received tag responses;

comparing the determined power level to an expected power level of a single tag response; and estimating how many tags are likely present based on the comparison.

* * * * *

UNITED STATES PATENT AND TRADEMARK OFFICE
CERTIFICATE OF CORRECTION

PATENT NO. : 8,120,494 B1
APPLICATION NO. : 11/749281
DATED : February 21, 2012
INVENTOR(S) : Aiouaz et al.

Page 1 of 1

It is certified that error appears in the above-identified patent and that said Letters Patent is hereby corrected as shown below:

1) On Title page 2, column 1, line 7, after Dec. 14, 2004, please delete "http://www.", therefor.

2) On Title page 2, column 2, line 2, after Dec. 17, 2005, please delete "http://www.", therefor.

3) Please delete "SUFFICENT" in sheet 12 of 12 (FIG. 11), line 14 and insert -- SUFFICIENT --, therefor.

4) After "channel." in column 5, lines 50-60, please delete "Tag 120 can respond with a backscatter that is modulated......outside the reader's channel." and insert the same on Col. 5, Line 51 as a new paragraph.

5) In Claim 9, column 15, line 56, please delete "complete." and insert -- completed. --, therefor.

6) In Claim 51, column 18, line 56, please delete "responses:" and insert -- responses; --, therefor.

Signed and Sealed this
Nineteenth Day of June, 2012

David J. Kappos
*Director of the United States Patent and Trademark Office*